Oct. 15, 1946.                G. L. USSELMAN                 2,409,457
                          WAVELENGTH MODULATION
                           Filed Feb. 21, 1944

INVENTOR.
GEORGE L. USSELMAN
BY
H. G. Grover
ATTORNEY.

Patented Oct. 15, 1946

2,409,457

UNITED STATES PATENT OFFICE 2,409,457

WAVELENGTH MODULATION

George L. Usselman, Port Jefferson, N. Y., assignor to Radio Corporation of America, a corporation of Delaware Application February 21, 1944, Serial No. 523,232

9 Claims. (Cl. 179—171.5)

This application concerns timing modulation systems and more exactly systems for generating wave energy and controlling or modulating the timing of the generated wave energy as desired.

Many systems for this purpose are known in the radio art, and the general object of this application is improved wave generation and wave length control.

A more specific object of the present invention is to provide a more simplified and more efficient arrangement for generating wave energy and controlling the wave length thereof, which arrangement uses a relatively small number of tubes and circuit elements.

An additional object of this invention is an arrangement as described in the preceding paragraph such that the generated wave energy is controlled as to timing through a considerable range without causing undue undesired amplitude modulation thereof.

The manner in which the above objects and other objects, which appear hereinafter, are attained will be apparent from the description which follows and therefrom when read in connection with the attached drawing.

Figure 1:
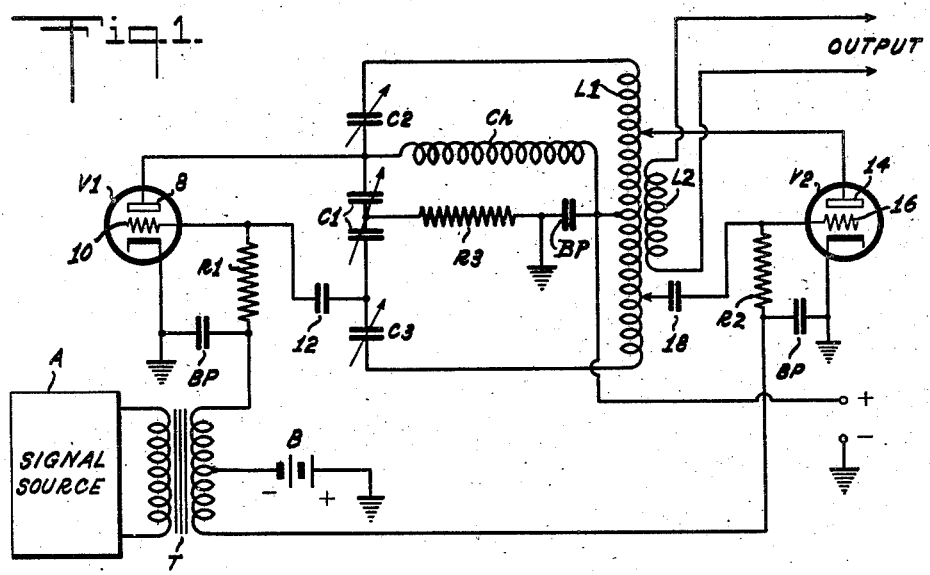
Figure 2:
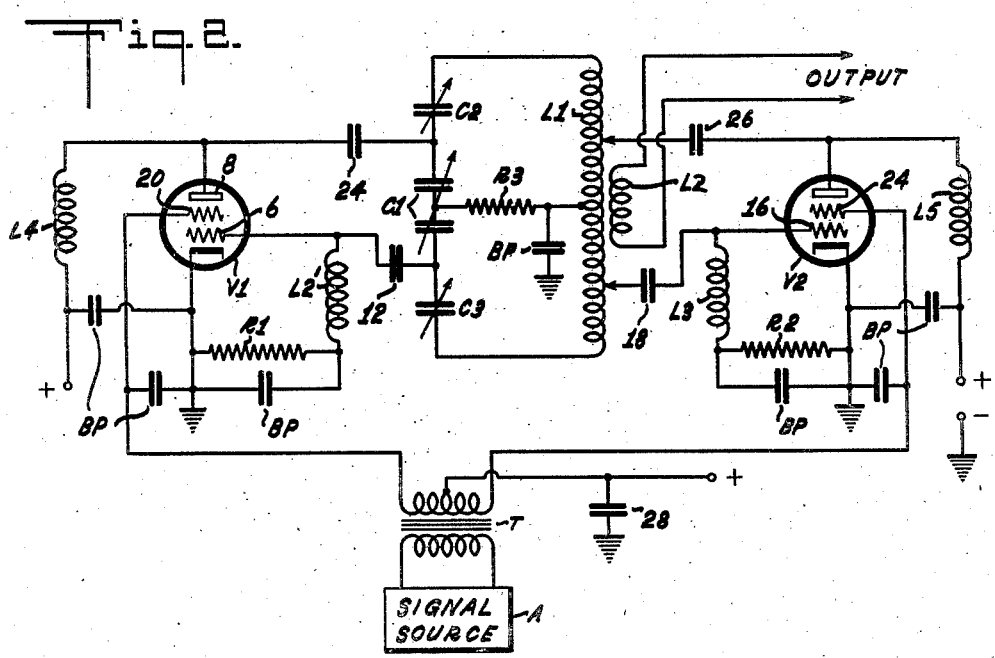

Figs. 1 and 2 each illustrate diagrammatically by circuit connections the essential elements of a timing modulation system arranged in accordance with my invention. The two embodiments are substantially the same, except that in the embodiment of Fig. 1 triode tubes are used in the circuits, whereas in the embodiment of Fig. 2 multi-grid tubes are used. In the embodiment of Fig. 1 the control of the timing of the generated oscillations is by way of control grid electrodes, whereas other grid electrodes are used for this purpose in Fig. 2.

In Fig. 1 of the drawing, the tank circuit comprising an inductive branch L1 and a capacitive branch C1, C2, C3, is connected in an oscillation generating circuit including two tubes V1 and V2. In the embodiment shown, the tubes may be considered as in parallel in the oscillation generating circuits, and the arrangement is also such that each of the tubes per se may be considered as a separate generator having as a tank circuit L1, C1, C2, and C3. However, the tank circuit is common, so that the tubes operate in unison.

In the arrangement, the anode 8 of V1 is coupled to the capacitive leg at a point on one side of the point at which the tank circuit is grounded. The control grid 10 of this tube is coupled by a coupling and blocking condenser 12 to the capacitive branch on the other side of the said point at which the tank circuit is grounded. The cathode of V1 is grounded, and thus the connections are such as to operate the anode and grid at opposed radio frequency potentials to make use of regeneration in the production of oscillations when the electrodes are provided with operating potentials.

The anode 14 and grid 16 are coupled in a similar manner to the inductive branch L1 of the tank circuit. This coupling includes direct current blocking and coupling condenser 18. Here again, for reasons pointed out above in connection with tube V1, oscillations are generated in the tube V2 when operating potentials are supplied to the tube electrodes.

Anode potential is supplied to the tube V1 through choking inductance CH and to the tube V2 through a part of the inductance L1. Biasing potential is supplied to the control grids 10 and 16 by virtue of current (due to grid rectification) in resistances R1 and R2 or the same supplemented by potential from the source B. The purpose of resistor R3 is to make it possible to provide an R.-F. ground for the center point of both branches of the tuned circuit and at the same time prevent split tuning of the tank circuit. That is to prevent the upper and the lower halves of the circuit from tuning separately.

The anodes of tubes V1 and V2 are both connected to the tank circuit on the same side of the ground connection, as are the grids of these tubes, so that the tubes operate in parallel using the same tank circuit.

The oscillation generating tubes V1 and V2 also have as a function modulation or control of the timing of the oscillations generated. The impedance between the anode and cathode of tube V1 is connected across C1 and constitutes a variable resistance tapped across this condenser C1, which is a portion of the total tank capacitive reactance, and determines in part the frequency of the oscillations generated.

The tube V2 has its output impedance coupled across a portion of the inductive branch L1 of the tank circuit so that this tube output impedance constitutes a variable resistance tapped across a part of L1 which is equivalent to being tapped across a portion of the total tank inductive reactance which also determines in part the frequency of the oscillations generated.

It is known that if a resistance is tapped across a portion of any reactance the total effective reactance is changed. A variation of this resistance also produces a variation in the total reactance.

Where the reactance is used in an oscillation generator circuit as is the case here, this causes a change in frequency of the oscillations generated.

In my arrangement I have the variable resistances, i. e., the outputs of V1 and V2 tapped across a portion of the reactance in each leg or side of the parallel tuned tank circuit. That is, one tube's output is tapped across a portion of the capacitive reactance and the other tube's output is tapped across a portion of the inductive reactance of the tuned circuit. If both of these tube resistances are alike and are tapped across the same proportion of the total reactance of the two branches of the tank circuit, the frequency to which the tank circuit is tuned is not changed. This is because the increase in capacitive reactance is accompanied by a decrease in inductive reactance and vice versa, so that in general the tuning of the circuit is unchanged. As long as these resistances remain equal, though they be varied, the tuning of the circuit remains unchanged. However, if one resistance be changed, for example, by changing the current in one tube, or if both tube resistances be changed in opposite sense, for example, by changing the currents in both tubes in opposite sense, then the tuning frequency of the tank circuit is changed.

The arrangement including tubes V1 and V2 and the tank circuit is, as stated above, an oscillation generator. Since the tube output impedances are connected across portions of the tank reactance as explained in detail above, and are arranged for differential individual amplitude modulation, the timing of the oscillations generated is modulated and the arrangement is a timing modulation system.

If the tubes V1 and V2 are similar and are symmetrically tapped on the reactive legs the timing modulation characteristic is symmetrical above and below a mean carrier frequency. Both tubes V1 and V2 deliver their generated energy to the same tank circuit and the fact that both tubes are differentially modulated in amplitude assures that amplitude modulation is balanced out of the output signal.

In the embodiment of Fig. 1, the tube output resistances and currents are varied by differentially varying the tube grid potentials. A change in grid potential in the positive direction increases the anode current and thereby decreases the tube resistance. The effect of this on say the capacitive branch is to increase the capacity. The effect of this on the inductive branch is to decrease the inductance. Conversely, a change in the grid potential in a negative direction decreases the anode current, thereby increasing the tube output impedance. The effect of this on say the capacitive branch is to decrease the capacity and on the inductive branch to increase the inductance. This therefore requires that the modulation or control potentials are applied differentially.

In the embodiment illustrated, the control potentials are supplied from source A through a transformer T differentially to the control grids.

The embodiment of Fig. 2 is essentially the same as the embodiment of Fig. 1. In Fig. 2, however, the tubes V1 and V2 have additional grids 20 and 24 to which the modulation is applied differentially by transformer T. These grids are shown as operating at positive potentials and may be considered screen grids.

The inductance coils L2', L3, L4 and L5 are used to balance out or cancel the effect of capacitive reactance between the tube electrodes. For example, L2' compensates or cancels out the capacitive reactance between the control grid 6 and the cathode in tube V1. L3 serves a similar purpose in connection with tube V3. L4 is of a value such as to balance out the capacitive reactance between the anode and cathode of tube V1. Inductance L5 serves a similar purpose in the circuits of tube V2. The advantage of cancelling the tube capacities at the operating frequencies is that there remains only the resistive component of the tube impedance which is the one I vary to produce the frequency modulation. The tube capacitive reactance does not vary and therefore produces no useful modulation. It may cause distortion by unbalancing the modulator circuit. Therefore it is wise to cancel it out.

In the embodiment of Fig. 2, the control grids 6 and 16 are biased by the potential drop in resistances R1 and R2 caused by current flowing in the grid circuit due to grid rectification. The inductances L4 and L5 serve as anode direct current supply circuits for the tubes V1 and V2, while the inductances L2' and L3 supply the bias potentials to the grids of tubes V1 and V2.

In both embodiments the reference character BP has been applied to radio frequency bypassing condensers, the function and connection of which are so well known in the art as to hardly need discussion herein. In Fig. 2, 24 and 26 are high frequency coupling and direct current blocking condensers. 28 is a modulation potential frequency bypass condenser.

In both embodiments the connections between the tank circuit and the anode and grid of either tube V1, V2, may be reversed with respect to the point at which the tank circuit is ground or neutral without changing the operation of the frequency modulation. This is obvious because the tube arrangements would still be such as to provide regeneration therein. The oscillator tubes might then be considered as being coupled differentially to the tank circuit.

In the modification of Fig. 2, a frequency shift of 25 kc. was obtained at a carrier frequency of 3188 kc.

I claim:

1. In a wave generating and wave length modulating system, a capacitive element and an inductive element, a discharge device having an anode, a control grid and a cathode, connections including at least a part of one of said elements regeneratively coupling the anode, control grid, and cathode of said device in a circuit for the production of oscillations, the arrangement being such that a part at least of said one element is shunted by the impedance between the anode and cathode of said one device, a second electron discharge device having an anode, a cathode and a control grid, connections including at least a part of the other of said elements regeneratively coupling the anode, control grid and cathode of the second device in a circuit for the production of oscillations of substantially the same frequency, the arrangement being such that the impedance between the anode and cathode of said second device is in shunt to a part at least of said other element, and a source of modulating potentials coupled differentially between corresponding electrodes of said devices.

2. In a wave generating and wave length modulating system, a capacitive element and an inductive element, a pair of discharge devices each having an anode, a control grid, and a cathode, connections including at least a portion of said elements regeneratively coupling the anodes, control grids, and cathodes of said devices in a regenerative circuit for the production of oscillations, the arrangement being such that a portion of one of said elements is shunted by the impedance between the anode and cathode of one device, and a portion of the other of said elements is shunted by the impedance between the anode and cathode of the other device, and a source of modulating potentials coupled differentially between corresponding electrodes of said devices.

3. In a wave generating and wave length modulating system, a capacitive element, an inductive element in parallel with the capacitive element, a pair of discharge devices each having an anode, a control grid, and a cathode, connections including said elements regeneratively coupling the anodes, control grids, and cathodes of said devices in a regenerative circuit for the production of oscillations, the arrangement being such that a portion of one of said elements is shunted by the impedance between the anode and cathode of one device, and a portion of the other of said elements is shunted by the impedance between the anode and cathode of the other device, and a source of modulating potentials coupled differentially between corresponding electrodes of said devices.

4. In a signalling system, a capacitive element, an inductive element in parallel with the capacitive element, two discharge devices each having an anode, a control grid, and a cathode, connections including said parallel elements regeneratively coupling the anode, control grid, and cathode of each of said devices in an oscillation circuit for the production of oscillations, the arrangement being such that a portion of one of said elements is shunted by the impedance between the anode and cathode of one device, and a portion of the other of said elements is shunted by the impedance between the anode and cathode of the other device, and a source of modulating potentials coupled differentially between corresponding electrodes of said devices.

5. In a wave generating and wave length modulating system, a tank circuit having a capacitive branch and an inductive branch, a first discharge device having an anode, a control grid, and a cathode, connections coupling the anode and control grid of said device to spaced points on the capacitive branch of said circuit, and coupling the cathode of said device to a point on the capacitive branch intermediate said spaced points, thereby coupling the impedance between the anode and cathode of said device in shunt to capacity of said capacitive branch, a second electron discharge device having a cathode, an anode, and a control grid, connections coupling the anode and control grid of the second device to spaced points on the inductive branch of said tank circuit, and the cathode of the second device to a point intermediate said spaced points on said inductive branch, the arrangement being such that the anode to cathode impedance of said second device is in shunt to inductance of said inductive branch and the said electrodes of both devices are regeneratively coupled by said tank circuit for the production of oscillations in said tank circuit and a source of modulating potentials coupled differentially between corresponding electrodes of said devices.

6. A system as recited in claim 1 wherein said corresponding electrodes are the control grids of the first and second discharge devices.

7. A system as recited in claim 2 wherein said discharge devices each include a screen grid electrode, and wherein said screen grid electrodes are the corresponding electrodes to which the source of modulating potentials is differentially coupled.

8. A system as recited in claim 5 wherein said corresponding electrodes of the devices are the control grids of the devices.

9. A system as recited in claim 5 wherein said devices each have an additional grid-like electrode, and wherein said corresponding electrodes are said additional grid-like electrodes.

GEORGE L. USSELMAN.